(12) United States Patent
Zhang et al.

(10) Patent No.: US 11,623,541 B2
(45) Date of Patent: Apr. 11, 2023

(54) BATTERY SWAPPING STATION AND CONTROL METHOD THEREFOR

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Rui Zou, Shanghai (CN); Libin Wan, Shanghai (CN); Junqiao Zhou, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 53 days.

(21) Appl. No.: 16/768,084

(22) PCT Filed: Nov. 30, 2018

(86) PCT No.: PCT/CN2018/118558
§ 371 (c)(1),
(2) Date: Jul. 23, 2020

(87) PCT Pub. No.: WO2019/105458
PCT Pub. Date: Jun. 6, 2019

(65) Prior Publication Data
US 2020/0353838 A1 Nov. 12, 2020

(30) Foreign Application Priority Data
Nov. 30, 2017 (CN) .......................... 201711240305.X (51) Int. Cl.
*H02J 7/00* (2006.01)
*H02J 7/14* (2006.01)
(Continued)

(52) U.S. Cl.
CPC ............. *B60L 53/80* (2019.02); *B60L 53/305* (2019.02); *B60L 53/35* (2019.02); *B60L 53/62* (2019.02);
(Continued)

(58) Field of Classification Search
USPC .................................................. 320/104, 109
See application file for complete search history.

(56) References Cited

U.S. PATENT DOCUMENTS 5,612,606 A * 3/1997 Guimarin .................. B60L 3/12
414/281
6,094,028 A * 7/2000 Gu ...................... H01M 10/441
320/109
(Continued)

FOREIGN PATENT DOCUMENTS

CN 102267437 A 12/2011
CN 102390363 A 3/2012
(Continued)

OTHER PUBLICATIONS

Jul. 28, 2021 European Search Report issued in European application No. 18883376.8.
(Continued)

*Primary Examiner* — Alexis B Pacheco (57) ABSTRACT

Disclosed are a battery swapping station and a control method therefor. The battery swapping station comprises: a first battery swapping platform being arranged between a first charging compartment and a second charging compartment; a first shuttle travels between the first battery charging compartment and the first battery swapping platform, a
(Continued)

second shuttle travels between the second battery charging compartment and the first battery swapping platform; a control unit being electrically connected to the first shuttle and to the second shuttle, used for the following operation: when operating a same vehicle on the first battery swapping platform, if the first shuttle is executing either operation of battery unmounting or battery mounting, the second shuttle executes the other operation. Through the battery swapping station and the control method therefor, the waiting time for vehicles when swapping batteries can be reduced, thus increasing the battery swapping efficiency of the battery swapping station.

15 Claims, 9 Drawing Sheets

(51) Int. Cl.
  *B60L 53/80* (2019.01)
  *B60L 53/62* (2019.01)
  *B60L 58/12* (2019.01)
  *B60L 53/30* (2019.01)
  *B60L 53/35* (2019.01)

(52) U.S. Cl.
  CPC ............ *B60L 58/12* (2019.02); *H02J 7/0013* (2013.01); *H02J 7/0045* (2013.01); *H02J 7/0049* (2020.01); *H02J 2310/48* (2020.01)

(56) References Cited

U.S. PATENT DOCUMENTS

| | | | | |
|---|---|---|---|---|
| 9,187,004 | B1* | 11/2015 | Davis | B60L 53/30 |
| 2009/0198372 | A1* | 8/2009 | Hammerslag | B60L 53/305 |
| | | | | 700/226 |
| 2010/0071979 | A1* | 3/2010 | Heichal | B60K 1/04 |
| | | | | 180/68.5 |
| 2010/0112843 | A1 | 5/2010 | Heichal et al. | |
| 2010/0141206 | A1 | 6/2010 | Agassi et al. | |
| 2015/0307068 | A1* | 10/2015 | Gaffoglio | B60L 50/60 |
| | | | | 414/809 |
| 2016/0368464 | A1* | 12/2016 | Hassounah | B60L 53/80 |
| 2017/0327091 | A1* | 11/2017 | Capizzo | H02J 7/0013 |
| 2019/0118782 | A1* | 4/2019 | O'Hora | B60L 53/80 |
| 2020/0206962 | A1* | 7/2020 | Sohmshetty | B25J 19/005 |

FOREIGN PATENT DOCUMENTS

| | | |
|---|---|---|
| CN | 204056922 U | 12/2014 |
| CN | 204488761 U | 7/2015 |
| CN | 106364465 A | 2/2017 |
| CN | 206436985 U | 8/2017 |
| CN | 206552008 U | 10/2017 |
| CN | 207697714 U | 8/2018 |
| CN | 207698814 U | 8/2018 |
| CN | 109849861 A | 6/2019 |
| DE | 102009035253 A1 | 2/2011 |
| JP | 48083516 A | 11/1973 |
| JP | 2011518710 A | 6/2011 |
| WO | 2010033883 A1 | 3/2010 |

OTHER PUBLICATIONS

Jun. 15, 2021 Chilean first Office Action issued in Chilean application No. 202001446.
Feb. 28, 2019 International Search Report issued in International Patent Application No. PCT/CN2018/118558.
Feb. 28, 2019 Written Opinion of the International Searching Authority issued in International Patent Application No. PCT/CN2018/118558.
Office Action of Counterpart Iranian Application No. 139950140003001983 dated May 2, 2021.
Dec. 2, 2021 first office action issued in Singaporean application No. 11202006109V.
Feb. 7, 2022 first office action issued in Indonesian application No. P00202005598.
Jan. 10, 2022 first office action issued in Saudi Arabian application No. 520412084.
Second Office Action dated Mar. 24, 2022 issued in Eurasian Patent Application No. 202091362.
First Office Action dated Apr. 25, 2022 issued in Indian Patent Application No. 202027027261.
Sep. 7, 2022 First Office Action issued in Brazilian Patent Application No. BR112020010862-6.
Oct. 11, 2022 Third Office Action issued in Eurasian Patent Application No. 202091362.
Oct. 25, 2022 First Office Action issued in Japanese Patent Application No. 2020-529532.
Nov. 30, 2022 First Office Action issued in Colombian Patent Application No. NC2020/0008079.
Dec. 1, 2022 First Office Action issued in Israeli Patent Application No. 275004.

* cited by examiner

BATTERY SWAPPING STATION AND CONTROL METHOD THEREFOR

This application is a National Stage of PCT Application No. PCT/CN2018/118558, filed on Nov. 30, 2018, which requests the priority of the Chinese patent application with the application No. 201711240305.X, filed on Nov. 30, 2017, the contents of which are incorporated herein by reference in their entireties.

TECHNICAL FIELD

The present invention relates to a battery swapping station and a control method therefor.

BACKGROUND

Nowadays, vehicle exhaust emission still presents as an important factor of environmental pollution. To govern the vehicle emissions, the human kind has developed natural gas cars, hydrogen cars, solar cars and electric cars to take the place of oil-fueled cars. Electric cars are the most prospecting one.

Direct-charge electric cars are mostly small cars, for example, taxis and family cars. Direct-charge electric cars are currently charged by the charging piles built on the ground. However, the charging piles are difficult to manage, especially with the increasing popularity of electric cars, centralized management of charging to the electric cars becomes more difficult.

Quick-change is currently used for bus system. At the quick-change station, the on-board power battery of electric buses can be quickly changed to ensure the continuous operation of those electric buses. But, at present, the problems of long time for battery change and low efficiency in change operation exist in the quick-change station.

DISCLOSURE OF THE INVENTION

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

The present invention provides a high-efficient battery swapping station and a control method therefor, to overcome the deficiencies of the battery swapping station in the prior art that the battery change time is long and the change efficiency is low.

The present invention solves the above technical problems by the following technical solutions:

A battery swapping station, comprising:

a first charging compartment and a second charging compartment, both the first charging compartment and the second charging compartment being used to store a battery of a vehicle and charge the battery of the vehicle;

a first battery swapping platform, the first battery swapping platform being arranged between the first charging compartment and the second charging compartment; and the first battery swapping platform being used to swap the batteries of the vehicle;

a first shuttle and a second shuttle, the first shuttle travels between the first battery charging compartment and the first battery swapping platform, the second shuttle travels between the second battery charging compartment and the first battery swapping platform, and the first shuttle and the second shuttle are both used for executing the operations of battery unmounting and battery mounting for the vehicle on the first battery swapping platform; and a control unit, the control unit is electrically connected to the first shuttle and to the second shuttle, the control unit is used for controlling the first shuttle and the second shuttle to perform the following operations: when operating a same vehicle on the first battery swapping platform, if the first shuttle is executing either operation of battery unmounting or battery mounting, the second shuttle execute the other operation of battery unmounting or battery mounting.

Preferably, the battery swapping station further comprises a second battery swapping platform and a third shuttle;

the second battery swapping platform is arranged at the opposite side of the first battery charging compartment relative to the first battery swapping platform;

the third shuttle travels between the first battery charging compartment and the second battery swapping platform and is electrically connected to the control unit, and the third shuttle is used to execute operations of battery unmounting and battery mounting for a vehicle on the second battery swapping platform.

A plurality of battery swapping channels (the second battery swapping platform) are arranged in the battery swapping station, which allows battery swapping for multiple vehicles at the same time, thus reducing the waiting time.

Preferably, a first stacker and a second stacker are arranged respectively in the first battery charging compartment and the second battery charging compartment, wherein both of the first stacker and the second stacker are electrically connected to the control unit;

a first front compartment and a first rear compartment which are mutually communicated are formed in the first battery charging compartment, the first stacker travels between the first front compartment and the first rear compartment, the first shuttle swaps batteries with the first stacker in the first front compartment, the first rear compartment is used to store a first battery rack, and the first stacker is used to pick and place batteries on the first battery rack;

a second front compartment and a second rear compartment which are mutually communicated are formed in the second battery charging compartment, the second stacker travels between the second front compartment and the second rear compartment, the second shuttle swaps batteries with the second stacker in the second front compartment, the second rear compartment is used to store a second battery rack, and the second stacker is used to pick and place batteries on the second battery rack;

Preferably, the first battery swapping platform is respectively connected to an uphill ramp and to a downhill ramp at upstream and the downstream of a travelling direction of the vehicle.

Preferably, the battery swapping station further comprises a first monitoring compartment;

in the direction of a vehicle travelling to the first battery swapping platform, the first monitoring compartment is arranged at the upstream of the first battery charging compartment; and the control unit is arranged in the first monitoring compartment.

Preferably, the battery swapping station further comprises a first monitoring compartment and a second monitoring compartment;

the control unit comprises a first monitoring device and a second monitoring device, the first monitoring device and the second monitoring device are respectively arranged in the first monitoring compartment and the second monitoring compartment;

the first monitoring device is used for controlling the first shuttle to alternately execute the operations of battery unmounting and battery mounting for the vehicle on the first battery swapping platform.

the second monitoring device is used for controlling the second shuttle to alternately execute the operations of battery unmounting and battery mounting for the vehicle on the first battery swapping platform.

Preferably, the first shuttle comprises a chassis, a lifting frame and a jacking mechanism;

the jacking mechanism is connected to the chassis and the lifting frame and used to lift the lifting frame relative to the chassis; the jacking mechanism comprises a connecting rod, a first end of the connecting rod connected to the lifting frame in a rotary way, and a second end of the connecting rod connected to the chassis in a rotary way;

the lifting frame is used for unmounting and mounting the battery of the vehicle.

Preferably, the connecting rod is a cam.

A control method applied to the battery swapping station as described above, the control method comprises following steps:

S1: when a vehicle does not travel into the first battery swapping platform, the control unit controls the first shuttle to pick up a fully-charged battery from the first battery charging compartment and stand by in the first battery charging compartment;

S2: after the vehicle travels into the first battery swapping platform, the control unit controls the second shuttle to travel to the first battery swapping platform and unmount the battery of the vehicle.

S3: the control unit controls the first shuttle to mount the fully-charged battery on the vehicle which is on the first battery swapping platform;

Preferably, in the step S2, after the second shuttle unmounts the battery of the vehicle, the control unit controls the second shuttle to transfer the battery of the vehicle to the second battery charging compartment for charging and pick up a fully-charged battery from the second battery charging compartment and stand by in the second battery charging compartment;

in the step S3, after the first shuttle mounts the fully-charged battery on the vehicle which is on the first battery swapping platform, the control unit controls the first shuttle to return to the first battery charging compartment to stand by;

the control method further comprises following steps:

S4: after a next vehicle travels to the first battery swapping platform, the control unit controls the first shuttle to travel to the first battery swapping platform and unmount the battery of the vehicle, after the first shuttle unmounts the battery of the vehicle, the control unit controls the first shuttle to transfer the battery of the vehicle to the first battery charging compartment for charging and pick up the fully-charged battery in the first battery charging compartment and stand by in the first battery charging compartment;

S5: the control unit controls the second shuttle to mount the fully-charged battery on the vehicle which is on the first battery swapping platform; after the second shuttle mounts the fully-charged battery on the vehicle, the control unit controls the second shuttle to return the second battery charging compartment to stand by;

S6: return to the step S2.

The positive progress effect of the present invention lies in that: the battery swapping station and the control method therefor, by means of alternating operations of the first shuttle and the second shuttle, reduce the waiting time for vehicles when swapping batteries, thus increasing the battery swapping efficiency of the battery swapping station.

Description of symbols in the Figures: chassis 101; first side wall 102; second side wall 103; guide portion 104; rotating shaft 105; lifting frame 106; guide groove 107; vehicle fixing portion 120; first moving frame 121; first fork 122; unlocking mechanism 123; connecting plate 124; guide opening 125; battery lifting portion 130; second moving frame 131; insertion slot 132; tray 133; second fork 134; spring 135; insertion piece 136; guide block 140; guide rail 150; first driving portion 160; second driving portion 170; cam 181; insertion axis 182; bearing 183; jacking drive unit 184; pulley 185; first end 186; second end 187; battery swapping platform 190; lifting mechanism 191; vehicle 200; battery 210; battery swapping station 300; first battery swapping platform 301; second battery swapping platform 302; third shuttle 303; uphill ramp 304; downhill ramp 305; first full-function container 310; first battery charging compartment 311; first front compartment 312; first rear compartment 313; first monitoring compartment 314; first operating compartment 315; first monitoring device 316; first stacker 317; first shuttle 318; first battery rack 319; second full-function container 330; second battery charging compartment 331; second front compartment 332; second rear compartment 333; second monitoring compartment 334; second operating compartment 335; second monitoring device 336; second stacker 337; second shuttle 338; second battery rack 339.

DETAILED DESCRIPTION OF EMBODIMENTS

Combining the drawings, the present invention is further described below with embodiments, but the present invention is not hence limited within the range of the embodiments.

Figure 1:
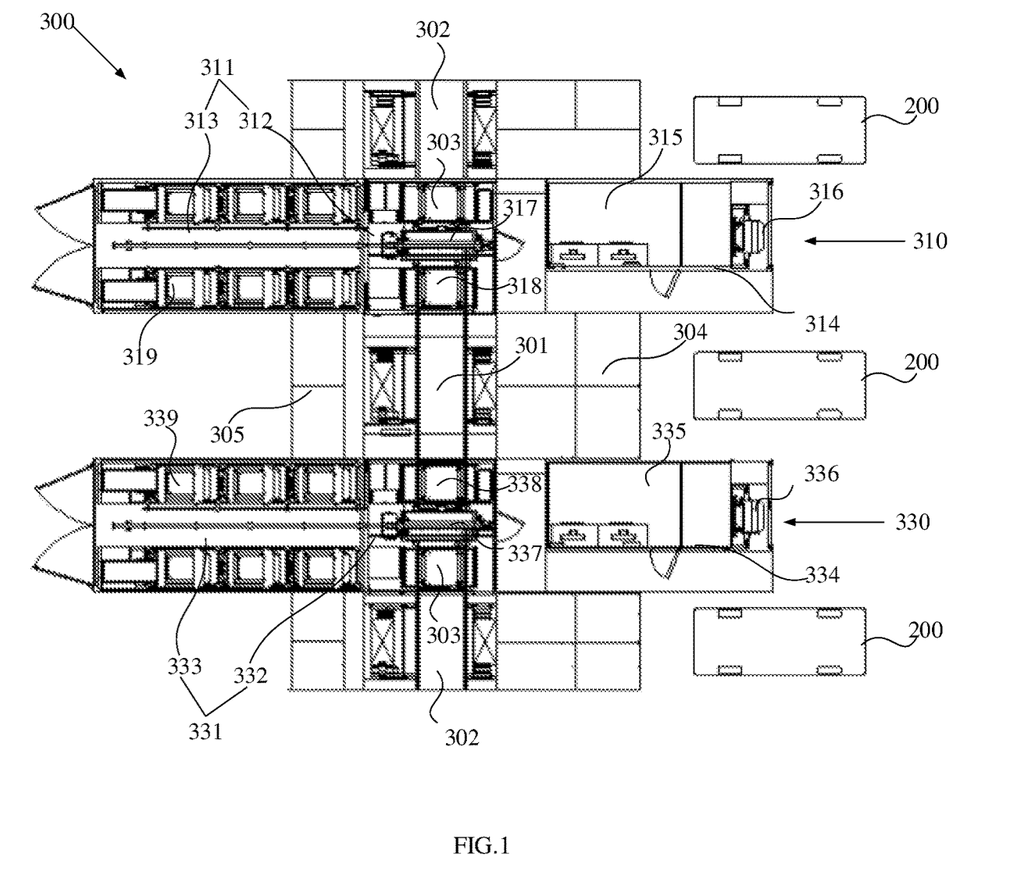
FIG. 1 is a schematic planar structure diagram of a battery swapping station according to a preferred embodiment of the present invention.

As shown in FIG. 1, a battery swapping station 300 comprises a first full-function container 310 and a second full-function container 330, and the first full-function container 310 and the second full-function container 330 are arranged side by side. A first battery swapping platform 301 is arranged between the first full-function container 310 and the second full-function container 330, while a second battery swapping platform 302 is arranged at the opposite side of the first full-function container 310 and the second full-function container 330 relative to the first battery swapping platform 301. A battery of a vehicle 200 can be replaced on the first battery swapping platform 301 and the second battery swapping platform 302. The first battery swapping platform 301 is respectively connected to an uphill ramp 304 and to a downhill ramp 305 at upstream and the downstream of a travelling direction of the vehicle 200, and the second battery swapping platform 302 is respectively connected to an uphill ramp 304 and to a downhill ramp 305 at upstream and the downstream of a travelling direction of the vehicle 200.

A first battery charging compartment 311 and a first monitoring compartment 314 are arranged in the first full-function container 310.

The first battery charging compartment 311 is used to store and charge the battery of the vehicle 200. A first stacker 317 and a first shuttle 318 are also arranged in the first battery charging compartment 311. The first shuttle 318 travels between the first battery charging compartment 311 and the first battery swapping platform 301. The first shuttle 318 is used for executing the operations of battery unmounting and battery mounting for the vehicle 200 on the first battery swapping platform 301. A first front compartment 312 and a first rear compartment 313 are mutually communicated and formed in the first battery charging compartment 311, the first stacker 317 travels between the first front compartment 312 and the first rear compartment 313, the first shuttle 318 swaps batteries with the first stacker 317 in the first front compartment 312, the first rear compartment 313 is used to store a first battery rack 319, and the first stacker 317 is used to pick and place batteries on the first battery rack 319.

In the direction in which the vehicle 200 travels to the first battery swapping platform 301, a first monitoring compartment 314 is arranged at upstream of the first battery charging compartment 311, and a first monitoring device 316 is arranged in the first monitoring compartment 314. In addition to a first monitoring device 316, a first operating compartment 315 for an operator's access is further arranged in the first monitoring compartment 314. The first monitoring device 316 is electrically connected to the first shuttle 318, the first stacker 317 and the battery rack for controlling the action of the first shuttle 318 and the first stacker 317, and monitoring the charging condition of the first battery rack 319.

A second battery charging compartment 331 and a second monitoring compartment 334 are arranged in the second full-function container 330.

The second battery charging compartment 331 is used to store the battery of the vehicle 200 and charge the battery of the vehicle 200. A second stacker 337 and a second shuttle 338 are further arranged in the second battery charging compartment 331. The second shuttle 338 travels between the second battery charging compartment 331 and the second battery swapping platform 302. The second shuttle 338 is used for executing operations of battery unmounting and battery mounting for the vehicle 200 on the first battery swapping platform 301. A second front compartment 332 and a second rear compartment 333 are mutually connected and formed in the second battery charging compartment 331, the second stacker 337 travels between the second front compartment 332 and the second rear compartment 333, the second shuttle 338 swaps batteries with the second stacker 337 in the second front compartment 332, the second rear compartment 333 is used to store a second battery rack 339, and the second stacker 337 is used to pick and place batteries on the second battery rack 339.

In the direction in which the vehicle 200 travels to the first battery swapping platform 301, a second monitoring compartment 334 is arranged at upstream of the second battery charging compartment 331, and a second monitoring device 336 is arranged in the second monitoring compartment 334. In addition to a second monitoring device 336, a second operating compartment 335 for an operator's access is further arranged in the second monitoring compartment 334. The second monitoring device 336 is electrically connected to the second shuttle 338, the second stacker 337 and the battery rack for controlling the action of the second shuttle 338 and the second stacker 337 and monitoring the charging condition of the second battery rack 339.

A third shuttle 303 is arranged at the opposite side of the first stacker 317 relative to the first shuttle 318 and at the opposite of the second stacker 337 relative to the second shuttle 338. The third shuttle 303 travels between the first battery charging compartment 311 and the second battery swapping platform 302, and the third shuttle 303 is electrically connected respectively to the first monitoring device 316 and the second monitoring device 336, the third shuttle 303 is used for executing operations of battery unmounting and battery mounting for the vehicle 200 on the second battery swapping platform 302.

When operating a same vehicle 200 on the first battery swapping platform 301, if the first shuttle 318 is executing either operation of battery unmounting or battery mounting, the second shuttle 338 executes the other operation of battery unmounting or battery mounting, and the first shuttle 318 and the second shuttle 338 alternatively execute the operations of battery unmounting and battery mounting, so that the batteries of the vehicle 200 can be swapped quickly. While, the second battery swapping platform 302 follows the normal battery swapping process.

Figure 2:
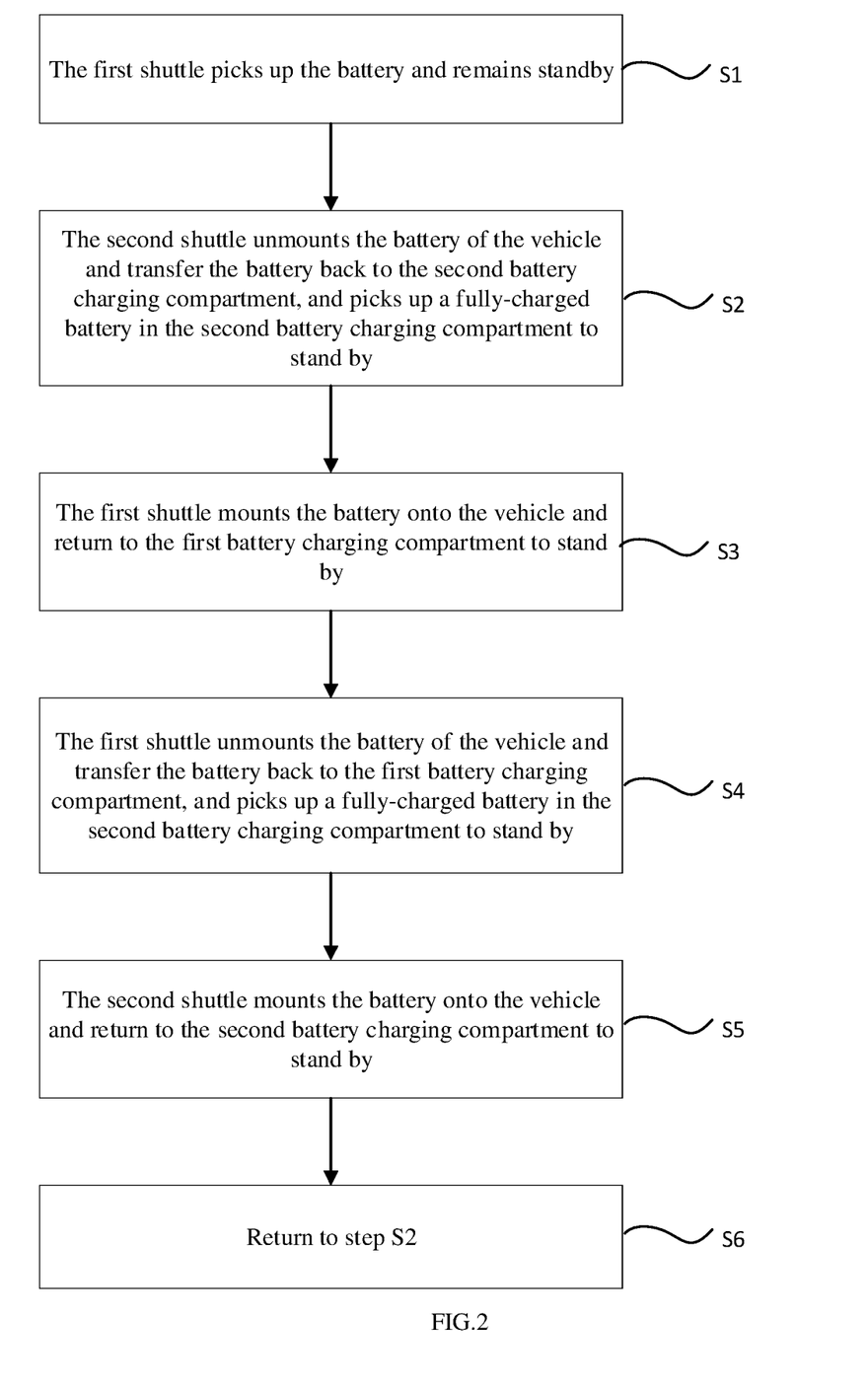
FIG. 2 is a schematic flow diagram of a control method of a battery swapping station according to a preferred embodiment of the present invention.

The process of battery swapping on the first battery swapping platform 301 is described below according to FIG. 2.

Step S1: when the vehicle 200 does not travel into the first battery swapping platform 301, the first monitoring device 316 controls the first shuttle 318 to pick up a fully-charged battery from the first battery charging compartment 311 and stand by in the first battery charging compartment 311.

Step S2: after the vehicle 200 travels into the first battery swapping platform 301, the second monitoring device 336 controls the second shuttle 338 to travel to the first battery swapping platform 301 and unmount the battery of the vehicle 200; after the second shuttle 338 unmounts the battery of the vehicle 200, the second monitoring device 336 controls the second shuttle 338 to transfer the battery of the vehicle 200 to the second battery charging compartment 331 for charging and pick up a fully-charged battery from the second battery charging compartment 331 and stand by in the second battery charging compartment 331. When the second shuttle 338 unmounts the battery of the vehicle 200, the first shuttle 318 can travel to one side of the vehicle 200 to stand by, so that when the second shuttle 338 travels out of the bottom of the vehicle 200 from the other side of the vehicle 200, the first shuttle 318 can travel into the bottom of the vehicle 200 from one side of the vehicle 200 to install battery for the vehicle 200. This can further save the time for swapping batteries.

Step S3: the first monitoring device 316 controls the first shuttle 318 to mount the fully-charged battery on the vehicle 200 which is on the first battery swapping platform 301; after the first shuttle 318 mounts the fully-charged battery on the vehicle 200 on the first battery swapping platform 301, the first monitoring device 316 controls the first shuttle 318 to return to the first battery charging compartment 311 to stand by.

Step S4: when a next vehicle 200 travels into the first battery swapping platform 301, the first monitoring device 316 controls the first shuttle 318 to travel to the first battery swapping platform 301 and unmount the battery of the vehicle 200; after the first shuttle 318 unmounts battery of the vehicle 200, the first monitoring device 316 controls the first shuttle 318 to transfer the battery of the vehicle 200 to the first battery charging compartment 311 for charging and pick up a fully-charged battery from the first battery charging compartment 311 and stand by in the first battery charging compartment 311. When the first shuttle 318 unmounts the battery of the vehicle 200, the second shuttle 338 can travel to one side of the vehicle 200 to stand by, so that when the first shuttle 318 travels out of the bottom of the vehicle 200 from the other side the vehicle 200, the second shuttle 338 can travel into the bottom of the vehicle 200 from one side of the vehicle 200 to install battery for the vehicle 200.

Step S5: the second monitoring device 336 controls the second shuttle 338 to mount the fully-charged battery on the vehicle 200 on the first battery swapping platform 301; after the second shuttle 338 mounts the fully-charged battery on the vehicle 200, the second monitoring device 336 controls the second shuttle 338 to return the second battery charging compartment 331 to stand by.

Step S6: return to the step S2.

In the above process, although the first monitoring device 316 and the second monitoring device 336 respectively control the device in the first full-function container 310 and the second full-function container 330, the first monitoring device 316 is also electrically connected to the second monitoring device 336 by means of wireless and wired communication to mutually coordinate and give instructions.

In the present embodiment, the first shuttle 318, the second shuttle 338, and the third shuttle 303 all adopt a cam structure, other than a traditional shear structure so that the initial height of the shuttles is low, thus to avoid setting deep pits on the battery swapping platforms resulting in reducing the overall height of the battery swapping platforms and decreasing the construction cost of the battery swapping station 300.

The structure of the first shuttle 318 is described below according to FIGS. 3-14. The structure of the second shuttle 338 and the structure of the third shuttle 303 are basically the same as that of the first shuttle 318 and will not be described again.

Figure 3:
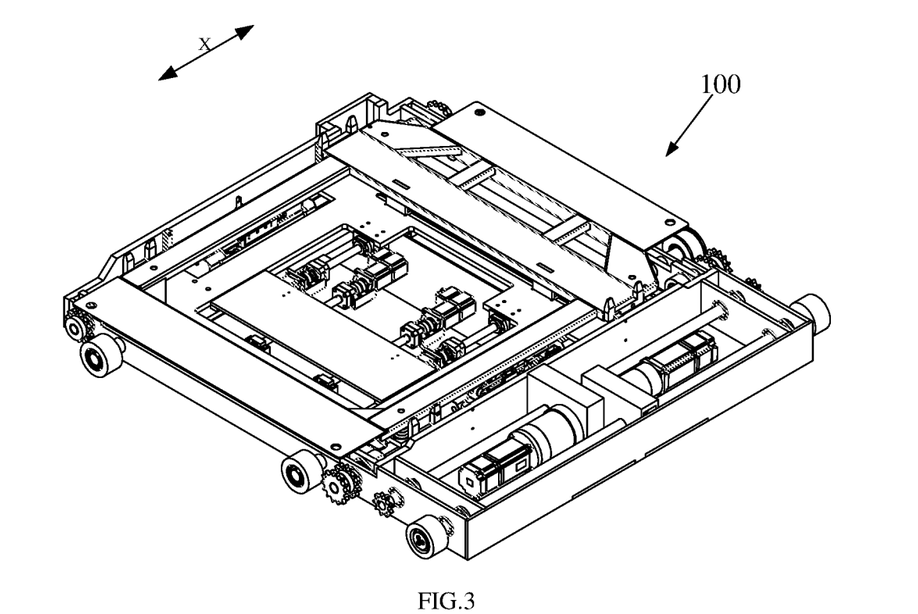
FIG. 3 is a schematic perspective diagram of a shuttle battery pack replacing device according to a preferred embodiment of the present invention.

As shown in FIG. 3, the first shuttle 318 comprises a chassis 101, a lifting frame 106, a battery lifting portion 130, a vehicle fixing portion 120 and a jacking mechanism.

Figure 4:
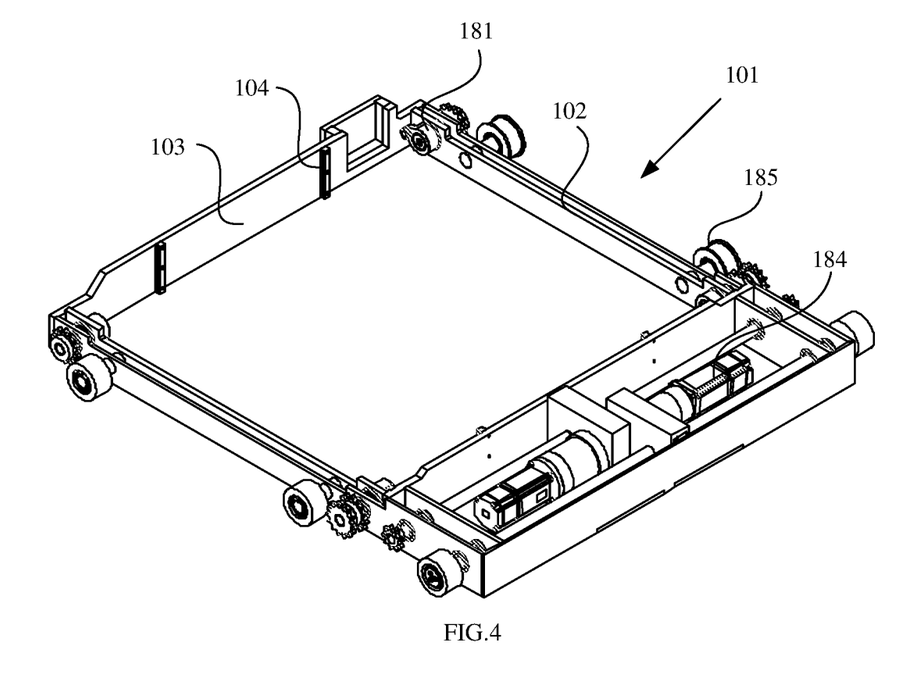
FIG. 4 is a schematic perspective diagram of a chassis according to a preferred embodiment of the present invention.

As shown in FIG. 4, the chassis 101 presents a four-frame structure, and the lifting frame 106 is arranged in the four-frame structure. A cam 181 is connected to the inner side of the two opposing first side walls 102 of the chassis 101, and a guide portion 104 is arranged at the inner side of a second side wall 103 of the chassis 101 which is adjacent to the first side wall 102.

Figure 5:
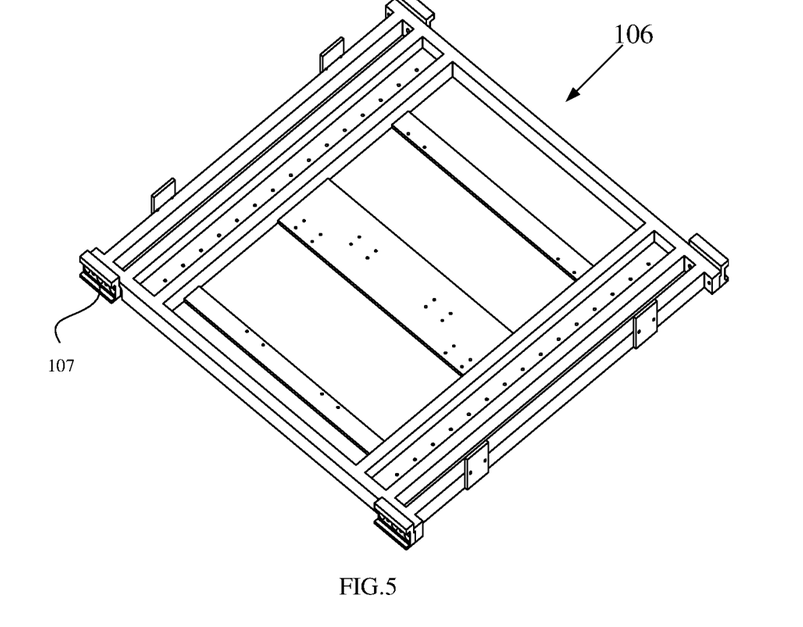
FIG. 5 is a schematic perspective diagram of a lifting frame according to a preferred embodiment of the present invention.

As shown in FIG. 5, the lifting frame 106 presents a plate type structure, a guide groove 107 is arranged at the side of the lifting frame 106 and the guide groove 107 extends in the horizontal direction.

Figure 6:
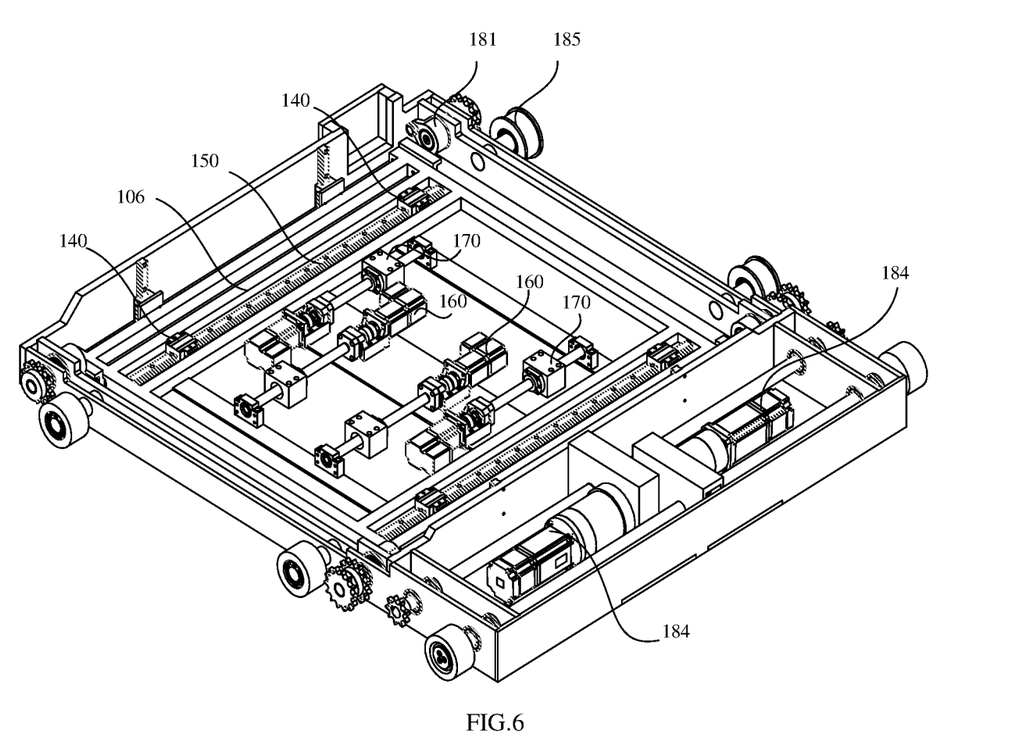
FIG. 6 is a partial schematic structure diagram of a shuttle battery pack replacing device according to a preferred embodiment of the present invention, wherein, the battery lifting portion and the vehicle fixing portion are removed.
Figure 7:
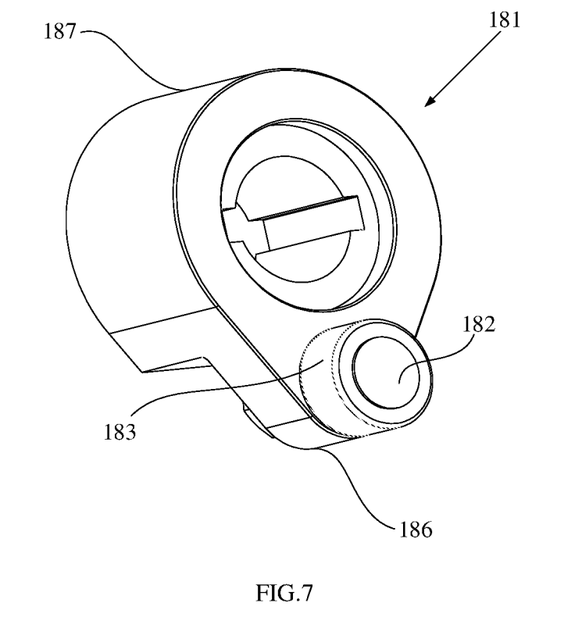
FIG. 7 is a schematic perspective diagram of a cam according to a preferred embodiment provided by the present invention.
Figure 8:
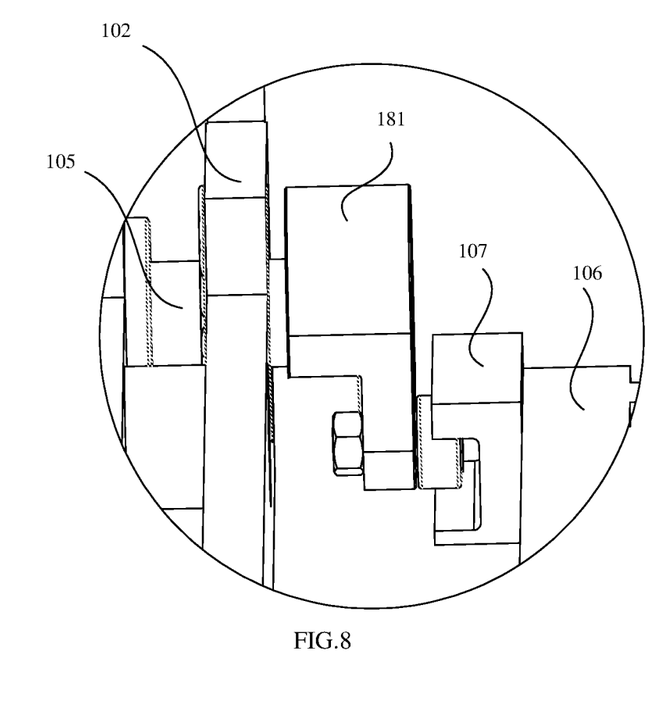
FIG. 8 is a schematic structure diagram of assembly of a cam and a lifting frame according to a preferred embodiment of the present invention.

As shown in FIGS. 6-8, the jacking mechanism is connected to the chassis 101 and the lifting frame 106, and lifts the lifting frame 106 relative to the chassis 101. As shown in FIG. 6, the cam 181 located on top of the drawing is not engaged with the lifting frame 106.

The jacking mechanism comprises four cams 181 which can be rotatably arranged on the chassis 101 via a rotating shaft 105; and a jacking drive unit 184. A first end 186 of the cam 181 is rotatably connected to the lifting frame 106, and a second end 187 of the cam 181 is rotatably connected to the chassis 101. The rotating shaft 105 is connected to the jacking drive unit 184. The jacking drive unit 184 is a rotary motor which is arranged on the chassis 101. The jacking drive unit 184 drives the rotating shaft 105 to rotate through a pulley structure arranged at the outer side of the chassis 101. FIG. 6 only illustrates the belt pulley 185, but the belt which is connecting to the pulley 185 is not illustrated.

An insertion axis 182 is arranged at the first end 186 of the cam 181, and the insertion axis 182 is inserted into the guide groove 107 and can slide in the guide groove 107. A bearing 183 sleeves on the insertion axis 182 to reduce the friction force when the insertion axis 182 slides in the guide groove 107. A guide portion 104 that extends vertically is arranged on the second side wall 103 of the chassis 101, and the guide portion 104 is used to guide the lifting frame 106 to move linearly in the up and down directions. In the present embodiment, the guide portion 104 is a vertically extending guide rail, the guide rail fits with a sliding block arranged on the lifting frame 106 to guide the lifting frame 106 to slide in the vertical direction. Alternatively, the guide portion may also be in other forms, for example, a vertically extending groove, a protrusion that fits with the groove arranged on the lifting frame, or when a guide portion is a sliding block, a guide rail is arranged on the lifting frame to fit with the sliding block.

FIG. 8 illustrates the fitting structure of the cam 181 with the guide groove 107 of the lifting frame 106 in the present embodiment. Under the combined action of the guide portion 104 and the guide groove 107, when the cam 181 is rotating, the lifting frame 106 can move linearly in the vertical direction without displacement in the horizontal direction.

In other embodiments, the cam 181 can also be replaced by other link mechanisms. Alternatively, the cam 181 is replaced by a rod piece. Preferably, the cam 181 may be replaced by an eccentric wheel. When an eccentric wheel is used, it can avoid the eccentric wheel from being jammed when it rotates to the top dead center or the bottom dead center.

Both the battery lifting portion 130 and the vehicle 200 fixing portion 120 can be arranged on the lifting frame 106 in a sliding way in the lateral direction (the direction indicated by the double-headed arrow X in FIG. 3). The battery lifting portion 130 and the vehicle 200 fixing portion 120 can cooperate with each other to execute battery mounting and unmounting for the vehicle 200.

Figure 9:
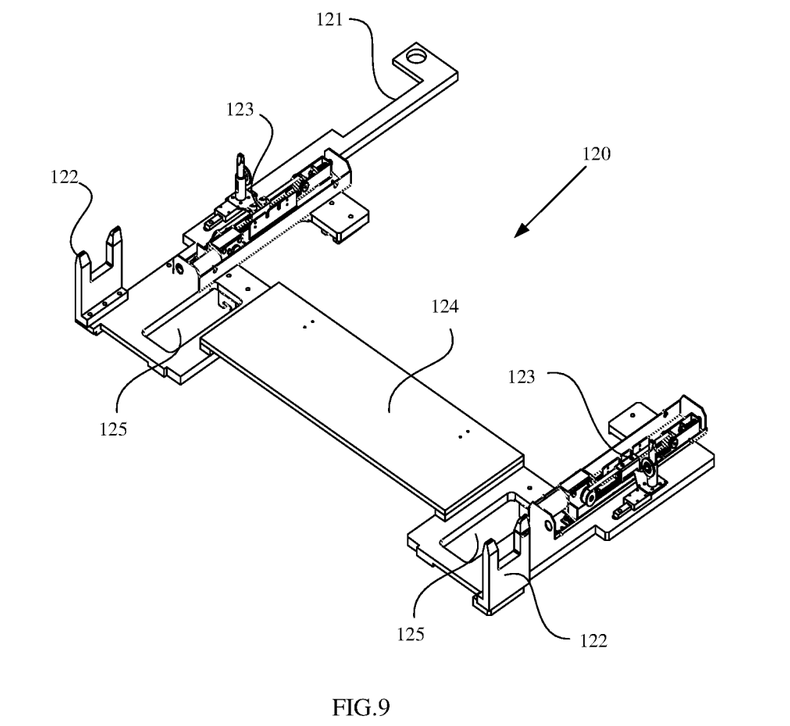
FIG. 9 is a schematic perspective diagram of a vehicle fixing portion according to a preferred embodiment of the present invention.

As shown in FIG. 9, the vehicle fixing portion 120 comprises a first moving frame 121 and an unlocking mechanism 123, the unlocking mechanism 123 is provided on the first moving frame 121. A first fork 122 is arranged on both sides of the first moving frame 121, and the first fork 122 is used to fork the vehicle 200 to be fixed relative to the vehicle 200. The unlocking mechanism 123 may unlock or lock the batteries on the vehicle 200.

Figure 10:
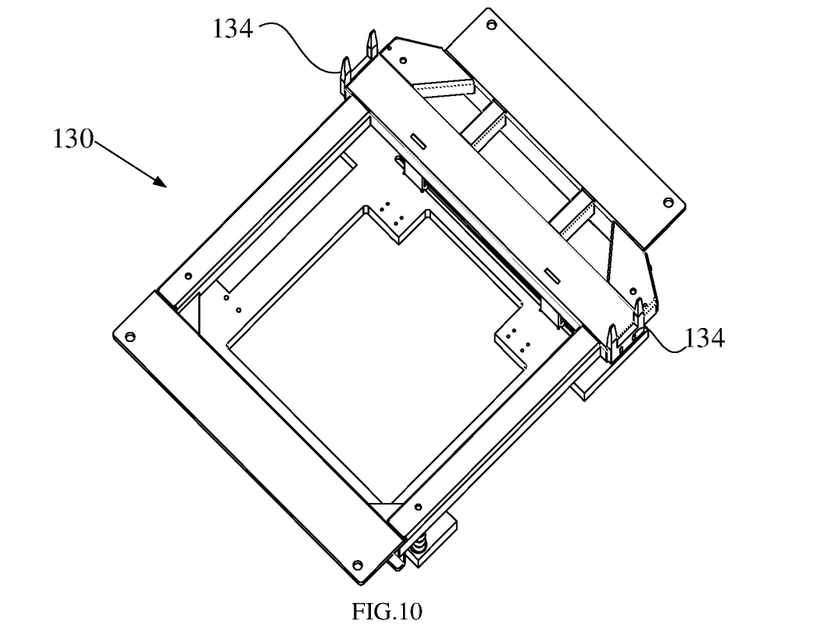
FIG. 10 is a schematic perspective diagram of a battery lifting portion according to a preferred embodiment of the present invention.
Figure 11:
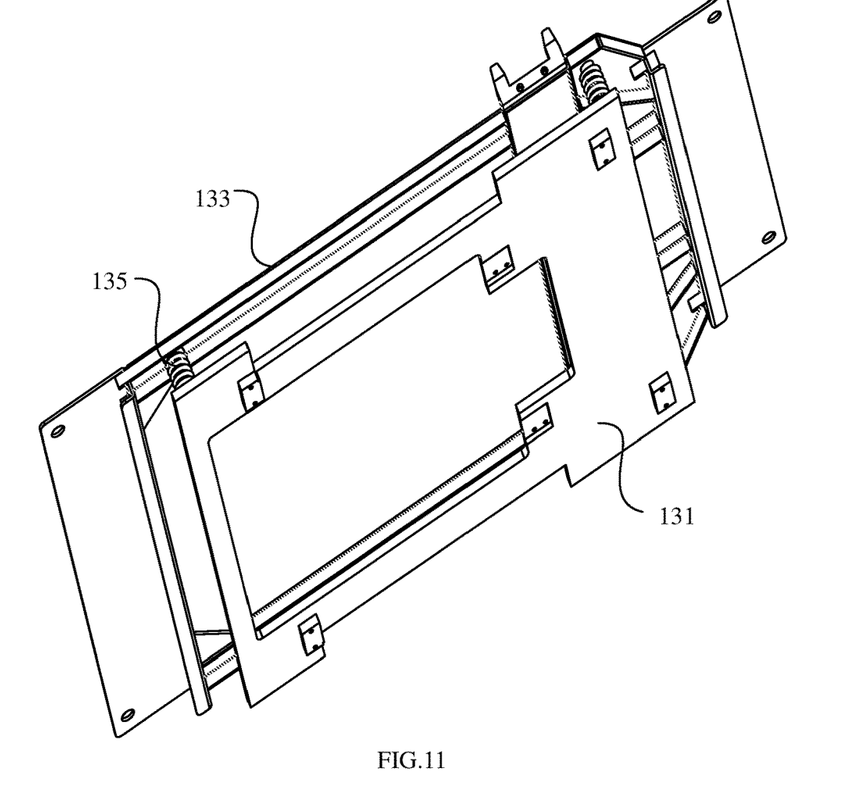
FIG. 11 is another schematic perspective diagram of a battery lifting portion according to a preferred embodiment of the present invention.

As shown in FIGS. 10-11, the battery lifting portion 130 includes a second moving frame 131 and a tray 133, the tray 133 is arranged above the second moving frame 131 and used to hold the battery, and the tray 133 and the second moving frame 131 are elastically connected with each other.

A spring 135 is arranged between the tray 133 and the second moving frame 131, the spring 135 sleeves on a pin (not shown), one end of the pin is fixed to either the tray 133 or the second moving frame 131, the length of the pin is shorter than the length of a undeformed spring 135 but longer than the minimum contracted length of the spring 135, so that the second moving frame 131 can elastically support the tray 133.

Figure 12:
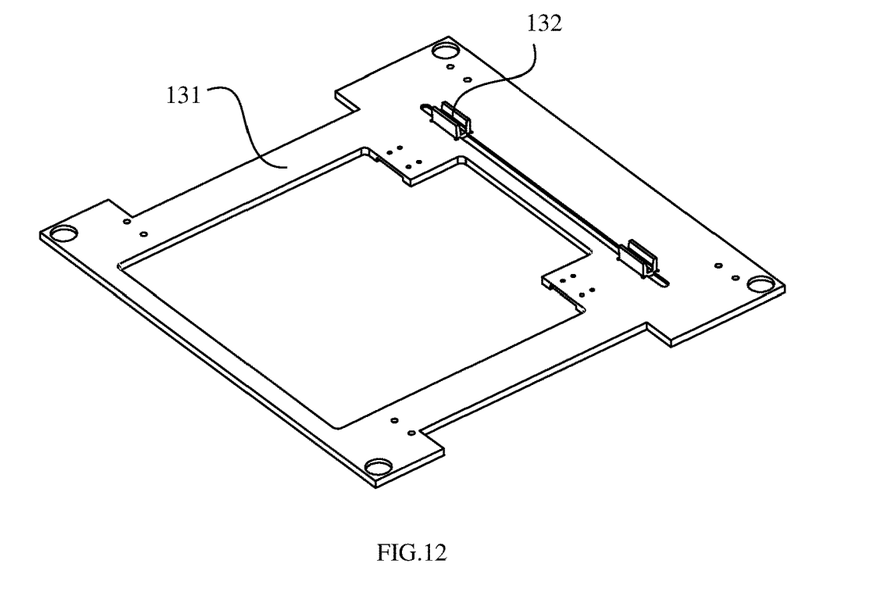
FIG. 12 is a schematic perspective diagram of a second moving frame according to a preferred embodiment of the present invention.
Figure 13:
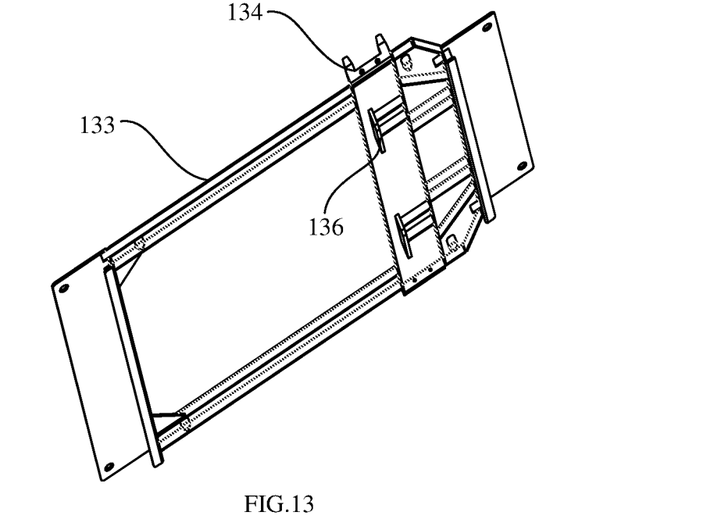
FIG. 13 is a schematic perspective diagram of a tray according to a preferred embodiment of the present invention.

As shown in FIGS. 12-13, a second fork 134 is arranged at the side of the tray 133, and the second fork 134 is used to fork the battery of the vehicle 200 to be fixed relative to the battery of the vehicle 200. An insertion piece 136 is arranged below the tray 133, and a "V" shaped insertion slot 132 is arranged above the second moving frame 131; the tray 133 is fixed relative to the second moving frame 131 through the insertion piece 136 which is inserted into the insertion slot 132, so that when the second moving frame 131 moves laterally, the tray 133 can be driven to move.

In the present embodiment, a schematic presentation is provided for a structure of the battery lifting portion that is a double-layer structure. Alternatively, the battery lifting portion may also be a single-layer plate type structure which can move laterally relative to the lifting frame and hold the battery, and the second fork is directly arranged on the single-layer plate type structure.

The shuttle battery pack replacing device 100 further comprises a horizontal travelling mechanism (not indicated in the figures), and the chassis 101 is arranged on the horizontal travelling mechanism. The chassis 101 may be fixedly connected to the horizontal travelling mechanism or just placed on the horizontal travelling mechanism. The horizontal travelling mechanism is used to drive the chassis to move horizontally on the pre-laid track. Optionally, the horizontal travelling mechanism may also be one that moves arbitrarily on a flat ground or a ramp according to an external remote control command.

According to FIGS. 6 and 14, the movement manners of the first moving frame 121 and the second moving frame 131 relative to the lifting frame 106 are briefly described as follows.

As shown in FIG. 6, a guide rail 150 is laterally arranged on the lifting frame 106, a guide block 140 is arranged on the lower surface of the first moving frame 121 and the second moving frame 131, and the guide block 140 can slide on the guide rail 150. The first moving frame 121 and the second moving frame 131 share the same guide rail 150. The lifting frame 106 is also provided with a first driving portion 160 and a second driving portion 170, the first driving portion 160 is used to drive the first moving frame 121 to move laterally, and the second driving portion 170 is used to drive the second moving frame 131 to move laterally.

Figure 14:
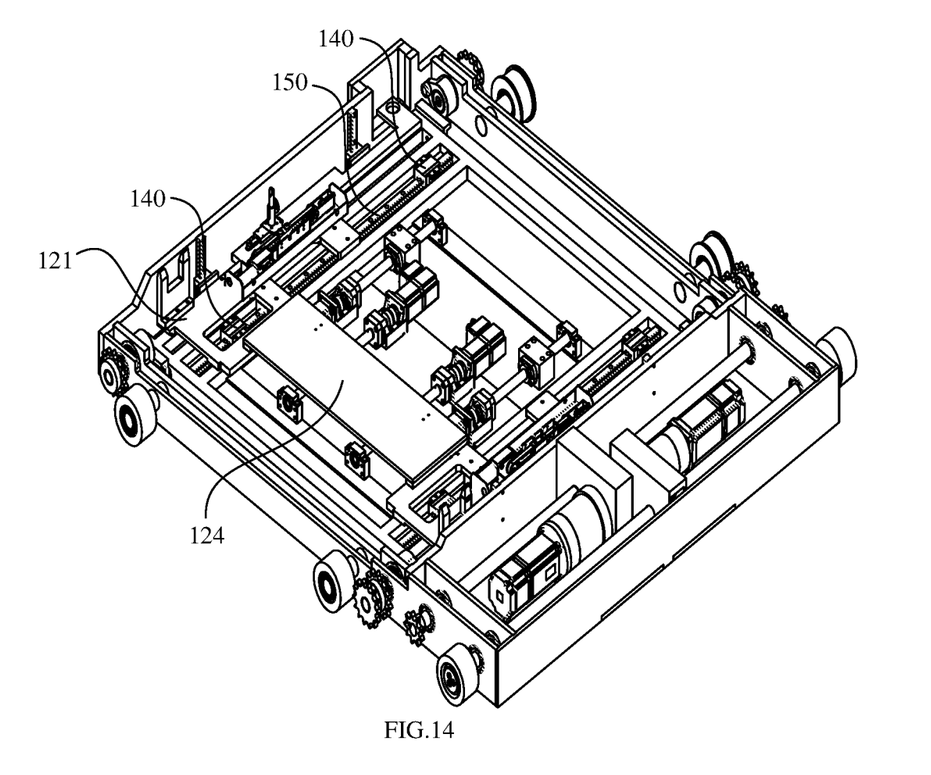
FIG. 14 is a schematic structure diagram of another part of a shuttle battery pack replacing device according to a preferred embodiment of the present invention, wherein, the battery lifting portion is removed.

As shown in FIG. 14, the first moving frame 121 is arranged below the second moving frame 131, and the first moving frame 121 is connected to the first driving portion 160 through a connecting plate 124 so that it can be driven by the first driving portion 160. A guide opening 125 is arranged on the first moving frame 121 to expose the guide block 140 which is connected to the second moving frame 131. The second moving frame 131 is arranged above the first moving frame 121 but is not in contact with the first moving frame 121, and the lower surface of the second moving frame 131 is connected to the second driving portion 170 so that it can be driven by the second driving portion 170. The first driving portion 160 and the second driving portion 170 both comprise a screw-nut transmission mechanism and a rotary motor that drives the screw of the screw-nut transmission mechanism to rotate, thus to achieve the linear motion of the first moving frame 121 and the second moving frame 131. The screw-nut transmission mechanism and the rotary have been widely used in the prior art, so no more detailed description will be provided herein. Those skilled in the art may also use other devices, such as a linear motor, as the first driving portion 160 and the second driving portion 170.

The first driving portion 160, the second driving portion 170 and the jacking drive unit 184 are under the common control of a control unit, the control unit may be a control device arranged on the first shuttle car 318, or may be a master control unit in the battery swapping station 300 in which using the first shuttle 318.

When it is required to unmount the battery of the vehicle 200, the first shuttle 318 moves to the bottom of the vehicle 200. The first driving portion 160 and the second driving portion 170 receive a command and allow the first moving frame 121 and the second moving frame 131 to move laterally to a preset position firstly, and then the jacking drive unit 184 receives the command and causes the lifting frame 106 to rise to the preset position; at this time, the first fork 122 forks the lock base for locking the battery pack on the vehicle 200, the second fork 134 forks the batteries of the vehicle 200, and the unlocking mechanism 123 unlocks the battery to make the battery unlocked from the vehicle 200, then the first moving frame 121 remains stationary, while the second moving frame 131 moves away from the first moving frame 121, so that the battery is removed from the vehicle 200; the battery falls on the tray 133 after being removed from the vehicle 200, the lifting frame 106 moves downward together with the battery, and then the first shuttle 318 drives away from the bottom of the vehicle 200 with bringing the removed battery.

When it is required to mount the battery of the vehicle 200, the first shuttle 318 moves to the bottom of the vehicle 200 with bringing a fully-charged battery, the first driving portion 160 and the second driving portion 170 receive a command and allow the first moving frame 121 and the second moving frame 131 to move laterally to a preset position, and then the jacking drive unit 184 receives the command and causes the lifting frame 106 to rise to the preset position; at this time, the first fork 122 forks the lock base for locking the battery pack on the vehicle 200, the second fork 134 forks the fully-charged battery; then the first moving frame 121 remains stationary, while the second moving frame 131 moves toward the first moving frame 121, so that battery are fixed onto the vehicle 200 and the unlocking mechanism 123 locks the battery on the vehicle 200.

Figure 15:
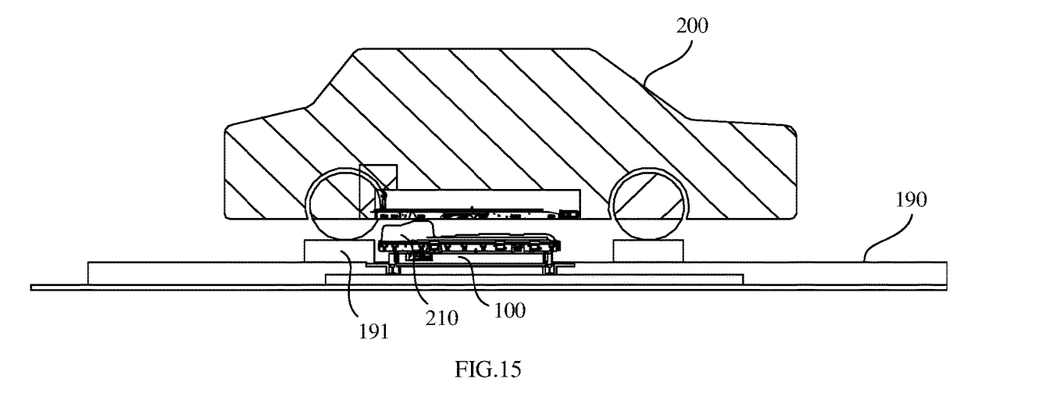
FIG. 15 is a schematic structure diagram of a battery swapping platform according to a preferred embodiment of the present invention.

As shown in FIG. 15, the battery swapping station 300 comprises a battery charging compartment (not shown), a battery swapping platform 190, a lifting mechanism 191 and a first shuttle 318.

The lifting mechanism 191 is arranged on the battery swapping platform 190 and is used to lift the vehicle 200 on the battery swapping platform 190. The lifting mechanism 191 is generally a pier for supporting four wheels of the vehicle 200. In FIG. 15, the lifting mechanism 191 is lifted.

The first shuttle 318 can travel between the battery swapping platform 190 and the charging compartment, and is used to transfer the fully-charged battery 210 in the charging compartment to the vehicle 200 or transfer the battery 210 unmounted from the vehicle 200 to the charging compartment for charging.

When the first shuttle 318 is loaded with the battery 210 (whether it is the battery unmounted from the vehicle 200 or the fully-charged battery) and needs to enter and exit from the bottom of the vehicle 200, the lifting mechanism 191 lifts the vehicle 200 up to allow the first shuttle 318 to enter and exit smoothly from the bottom of the vehicle 200.

As the first shuttle 318 adopts a cam mechanism, its own height is low (the total height of the equipment is 175 mm), the synchronous lifting height of four cams 181 is 80 mm, while the height of the floor of the vehicle 200 from the ground is generally 190 mm. After the vehicle 200 enters the battery swapping platform 190, the first shuttle 318 can directly enter the bottom of the vehicle 200, and the first shuttle 318 is lifted by 80 mm, thus to lock or unlock the battery. After unmounting the battery, the lifting mechanism 191 lift the vehicle 200 up by 200 mm, to allow the first shuttle 318 to move out of the bottom of the vehicle 200 with the battery loaded.

Because the overall height of the first shuttle 318 is reduced, it is not necessary to arrange a deep pit in the battery swapping platform 190 of the battery swapping station 300 to allow the first shuttle 318 to enter the bottom of the vehicle 200. Hence, the overall height of the battery swapping platform 190 is reduced, the height of the uphill ramp 304 and the downhill ramp 305 for entering the battery swapping platform 190 can be reduced to 230 mm (the original height is 480 mm), which further reduces the difficulty to drive towards the vehicle 200. The lengths of the uphill ramp 304 and the downhill ramp 305 are also reduced accordingly, from the original 7345 mm and 4545 mm to 4500 mm and 3000 mm, thereby reducing the construction cost of the battery swapping station 300.

Although the specific embodiments of the present invention have been described above, those skilled in the art should understand that this is only an example, and the protection scope of the present invention is defined by the enclosed Claims. Those skilled in the art can make various changes or modifications to these embodiments as long as not departing from the principle and essence of the present invention, but these changes and modifications will fall within the protection scope of the present invention.

The invention claimed is:

1. A battery swapping station, characterized in that the battery swapping station comprising:
    a first battery charging compartment and a second battery charging compartment, both the first battery charging compartment and the second charging compartment being used to store battery of a vehicle and charge the battery of the vehicle;
    a first battery swapping platform, the first battery swapping platform being arranged between the first battery charging compartment and the second battery charging compartment, and the first battery swapping platform being used to swap the battery of the vehicle;
    a first shuttle and a second shuttle, the first shuttle travels between the first battery charging compartment and the first battery swapping platform, the second shuttle travels between the second battery charging compartment and the first battery swapping platform, and the first shuttle and the second shuttle are both used for executing the operations of battery unmounting and battery mounting for a vehicle on the first battery swapping platform;
    a control unit, the control unit being electrically connected to the first shuttle and to the second shuttle, used for controlling the first shuttle and the second shuttle to perform the following operations: when operating a same vehicle on the first battery swapping platform, if the first shuttle is executing either operation of battery unmounting or battery mounting, the second shuttle is executing the other operation of battery unmounting or battery mounting.

2. The battery swapping station according to claim 1, characterized in that the battery swapping station further comprises a second battery swapping platform and a third shuttle; the second battery swapping platform is arranged at the opposite side of the first battery charging compartment relative to the first battery swapping platform; the third shuttle travels between the first battery charging compartment and the second battery swapping platform and is connected to the control unit, and the third shuttle is used to execute operations of battery unmounting and battery mounting for a vehicle on the second battery swapping platform.

3. The battery swapping station according to claim 2, characterized in that a first stacker and a second stacker are arranged respectively in the first battery charging compartment and the second battery charging compartment, wherein both of the first stacker and the second stacker are electrically connected to the control unit;
    a first front compartment and a first rear compartment which are mutually communicated are formed in the first battery charging compartment, the first stacker travels between the first front compartment and the first rear compartment, the first shuttle swaps batteries with the first stacker in the first front compartment, the first rear compartment is used to store a first battery rack, and the first stacker is used to pick and place batteries on the first battery rack;
    a second front compartment and a second rear compartment which are mutually connected are formed in the second battery charging compartment, the second stacker travels back and forth between the second front compartment and the second rear compartment, the second shuttle swaps batteries with the second stacker in the second front compartment, the second rear compartment is used to store a second battery rack, and the second stacker is used to pick and place batteries on the second battery rack.

4. The battery swapping station according to claim 1, characterized in that the first battery swapping platform is respectively connected to an uphill ramp and to a downhill ramp at upstream and downstream of a travelling direction of the vehicle.

5. The battery swapping station according to claim 1, characterized in that the battery swapping station further comprises a first monitoring compartment;
in the direction of a vehicle travelling to the first battery swapping platform, the first monitoring compartment is arranged at the upstream of the first battery charging compartment; and the control unit is arranged in the first monitoring compartment.

6. The battery swapping station according to claim 1, characterized in that the battery swapping station further comprises a first monitoring compartment and a second monitoring compartment;
the control unit comprises a first monitoring device and a second monitoring device, the first monitoring device and the second monitoring device are respectively arranged in the first monitoring compartment and the second monitoring compartment;
the first monitoring device is used for controlling the first shuttle to alternately execute the operations of battery unmounting and battery mounting for the vehicle which on the first battery swapping platform;
the second monitoring device is used for controlling the second shuttle to alternately execute the operations of battery unmounting and battery mounting for the vehicle which on the first battery swapping platform.

7. The battery swapping station according to claim 1, characterized in that the first shuttle comprises a chassis, a lifting frame and a jacking mechanism;
the jacking mechanism is connected to the chassis and the lifting frame and used to lift the lifting frame relative to the chassis; the jacking mechanism comprises a connecting rod, a first end of the connecting rod connected to the lifting frame in a rotary way and a second end of the connecting rod connected to the chassis in a rotary way;
the lifting frame is used for unmounting and mounting the battery of the vehicle.

8. The battery swapping station according to claim 7, characterized in that the connecting rod is a cam.

9. A control method, characterized in that the control method is applied to the battery swapping station according to claim 1, and characterized in that the control method includes the following steps:
S1: when a vehicle does not travel into the first battery swapping platform, the control unit controls the first shuttle to pick up a fully-charged battery from the first battery charging compartment and stand by in the first battery charging compartment;
S2: after the vehicle travels into the first battery swapping platform, the control unit controls the second shuttle to travel to the first battery swapping platform and unmount the battery of the vehicle;
S3: the control unit controls the first shuttle to mount the fully-charged battery on the vehicle which is on the first battery swapping platform.

10. The control method according to claim 9, characterized in that in the step S2, after the second shuttle unmounts the battery of the vehicle, the control unit controls the second shuttle to transfer the battery of the vehicle to the second battery charging compartment for charging and pick up a fully-charged battery in the second battery charging compartment and stand by in the second battery charging compartment
in the step S3, after the first shuttle mounts the fully-charged battery on the vehicle which is on the first battery swapping platform, the control unit controls the first shuttle to return to the first battery charging compartment to stand by;
the control method further comprises following steps:
S4: after a next vehicle travels to the first battery swapping platform, the control unit controls the first shuttle to travel to the first battery swapping platform and unmount the battery of the vehicle, after the first shuttle unmounts the battery of the vehicle, the control unit controls the first shuttle to transfer the battery of the vehicle to the first battery charging compartment for charging and pick up the fully-charged battery in the first battery charging compartment and stand by in the first battery charging compartment;
S5: the control unit controls the second shuttle to mount the fully-charged battery on the vehicle which is on the first battery swapping platform; after the second shuttle mounts the fully-charged battery on the vehicle, the control unit controls the second shuttle to return the second battery charging compartment to stand by;
S6: return to step S2.

11. The control method according to claim 10, characterized in that in the step S2, when the second shuttle unmounts the battery of the vehicle, the first shuttle travels to one side of the vehicle to stand by, so that when the second shuttle travels out of the bottom of the vehicle from the other side of the vehicle, the first shuttle travels into the bottom of the vehicle from one side of the vehicle to install battery for the vehicle,
in the step S4, when the first shuttle unmounts the battery of the vehicle, the second shuttle travels to one side of the vehicle to stand by, so that when the first shuttle travels out of the bottom of the vehicle from the other side the vehicle, the second shuttle travels into the bottom of the vehicle from one side of the vehicle to install battery for the vehicle.

12. The control method according to claim 9, characterized in that the first shuttle or the second shuttle both comprise a battery lifting portion, a vehicle fixing portion, a lifting frame and a jacking mechanism, the vehicle fixing portion comprises a first moving frame, a first fork is arranged on both sides of the first moving frame, the battery lifting portion includes a second moving frame and a tray, the tray is arranged above the second moving frame and used to hold the battery, a second fork is arranged at the side of the tray, and the second fork is used to fork the battery of the vehicle, the lifting frame is provided with a first driving portion and a second driving portion, the first driving portion is used to drive the first moving frame to move laterally, and the second driving portion is used to drive the second moving frame to move laterally; the jacking mechanism comprises a jacking driving unit;
in the step S2, the first driving portion and the second driving portion receive a command and allow the first moving frame and the second moving frame to move laterally to a preset position firstly, and then the jacking drive unit receives the command and causes the lifting frame to rise to a preset position; at this time, the first fork forks the lock base used for locking the battery pack on the vehicle, the second fork forks the batteries of the vehicle.

13. The control method according to claim 12, characterized in that the vehicle fixing portion comprise an unlocking mechanism, the unlocking mechanism is provided on the first moving frame, in the step S2, the unlocking mechanism unlocks the battery to make the battery unlocked from the vehicle, then the first moving frame remains stationary, while the second moving frame moves away from the first moving frame, so that the battery is removed from the vehicle; the battery falls on the tray after being removed from the vehicle, the lifting frame moves downward together with the battery, and then the first shuttle drives away from the bottom of the vehicle with bringing the removed battery.

14. The control method according to claim 13, characterized in that in the step S3, the first driving portion and the second driving portion receive a command and allow the first moving frame and the second moving frame to move laterally to a preset position, and then the jacking drive unit receives the command and causes the lifting frame to rise to a preset position; at this time, the first fork forks the lock base for locking the battery pack on the vehicle, the second fork forks the fully-charged battery.

15. The control method according to claim 14, characterized in that in the step S3, then the first moving frame remains stationary, while the second moving frame moves toward the first moving frame, so that battery are fixed onto the vehicle and the unlocking mechanism locks the battery on the vehicle.

* * * * *